(12) United States Patent
Hoover et al.

(10) Patent No.: US 11,566,153 B2
(45) Date of Patent: Jan. 31, 2023

(54) SELF-ADHESIVE MULTI-LAYER ITEM AND METHOD FOR THE PRODUCTION THEREOF

(71) Applicant: Elkem Silicones France SAS, Lyons (FR)

(72) Inventors: Jeffrey Hoover, Rock Hill, SC (US); Guillaume Pibre, Lezoux (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 482 days.

(21) Appl. No.: 15/741,797

(22) PCT Filed: Jul. 5, 2016

(86) PCT No.: PCT/FR2016/000113
§ 371 (c)(1),
(2) Date: Jan. 4, 2018

(87) PCT Pub. No.: WO2017/005992
PCT Pub. Date: Jan. 12, 2017

(65) Prior Publication Data
US 2018/0194976 A1     Jul. 12, 2018

(30) Foreign Application Priority Data
Jul. 6, 2015 (FR) .................................. 1501424

(51) Int. Cl.
| | | |
|---|---|---|
| *C09J 183/00* | (2006.01) | |
| *C09J 7/40* | (2018.01) | |
| *C09D 183/06* | (2006.01) | |
| *C09J 7/22* | (2018.01) | |
| *C09J 7/21* | (2018.01) | |
| *B32B 7/12* | (2006.01) | |
| *B32B 29/00* | (2006.01) | |
| *C08G 77/18* | (2006.01) | |
| *C08G 77/20* | (2006.01) | |

(52) U.S. Cl.
CPC ................. *C09J 7/401* (2018.01); *B32B 7/12* (2013.01); *B32B 29/00* (2013.01); *C08G 77/18* (2013.01); *C09D 183/06* (2013.01); *C09J 7/21* (2018.01); *C09J 7/22* (2018.01); *B32B 2250/02* (2013.01); *B32B 2255/26* (2013.01); *B32B 2405/00* (2013.01); *B32B 2519/00* (2013.01); *C08G 77/20* (2013.01); *C09J 2400/283* (2013.01); *C09J 2483/005* (2013.01); *Y10T 428/1457* (2015.01); *Y10T 428/1476* (2015.01)

(58) Field of Classification Search
CPC .................. C09J 7/401; C09J 7/22; C09J 7/21
See application file for complete search history.

(56) References Cited

U.S. PATENT DOCUMENTS

| | | | | |
|---|---|---|---|---|
| 4,201,808 A | * | 5/1980 | Cully .................. | C09D 183/06 428/40.7 |
| 4,952,657 A | * | 8/1990 | Riding ................. | C09D 183/04 528/27 |
| 5,510,190 A | * | 4/1996 | Allen .................. | C09D 183/06 428/447 |
| 2005/0136269 A1 | * | 6/2005 | Doehler ............... | C08G 77/08 428/447 |
| 2013/0300010 A1 | | 11/2013 | Chang et al. | |
| 2019/0002695 A1 | * | 1/2019 | Pibre ................... | C08K 5/45 |

FOREIGN PATENT DOCUMENTS

| | | | | |
|---|---|---|---|---|
| CA | 2530757 A1 | * | 1/2005 | .......... C09D 183/06 |
| EP | 0006705 A1 | | 1/1980 | |
| WO | 2013013568 A1 | | 1/2013 | |

OTHER PUBLICATIONS

PCT International Search Report for PCT/FR2016/000113, dated Dec. 7, 2016.
Written Opinion of the International Searching Authority, PCT/FR2016000113, dated Dec. 7, 2016.

* cited by examiner

*Primary Examiner* — Anish P Desai
(74) *Attorney, Agent, or Firm* — McBee Moore & Vanik IP, LLC; Susan McBee; Stephanie Amoroso

(57) ABSTRACT

A self-adhesive multi-layer item comprising:
1) a dorsal support DO having a top face SI1 and a bottom face SI2,
2) at least one layer of silicone release coating RC applied to the top face SI1 of the dorsal support DO and which is prepared by irradiation of a curable silicone composition C not containing any solvent and comprising, as constituents:
   a) at least one functionalized organopolysiloxane A
   b) an effective amount of at least one type I photoinitiator P of the family of acylphosphine oxide derivatives of formula (III)
3) at least one adhesive PSA, preferably at least one pressure-sensitive adhesive PSA, applied on the layer of silicone release coating,
4) a frontal support FR applied on the adhesive PSA of the component 3), and
5) optionally at least one layer of silicone release coating RC applied on the bottom face SI2 of the dorsal support DO and which is prepared by application and irradiation of said curable silicone composition C, and on this same layer, there is at least one adhesive PSA, preferably at least one pressure-sensitive adhesive PSA.

16 Claims, No Drawings

SELF-ADHESIVE MULTI-LAYER ITEM AND METHOD FOR THE PRODUCTION THEREOF

CROSS-REFERENCE TO RELATED APPLICATIONS

This application is a National Stage entry of International Application No. PCT/FR2016/000113, filed Jul. 5, 2016, which claims priority to French Patent Application No. 1501424, filed Jul. 6, 2015.

BACKGROUND

Field of the Invention

The field of the invention is that of self-adhesive multi-layer items and the processes for producing same and more particularly self-adhesive multi-layer items in which a crosslinked or polymerized silicone matrix is combined with an adhesive.

Description of Related Art

A conventional self-adhesive multi-layer item structure comprises a laminate of a frontal support material, a layer of adhesive, usually a layer of pressure-sensitive adhesive, and a dorsal support material rendered nonadhesive by coating with a specific coating.

The frontal support can be very varied in nature, but it is usually made of paper or plastic. The dorsal support material rendered nonadhesive allows separation of the adhesive part from the dorsal support by peeling off. This is particularly used in the case of labels, tapes or other self-adhesive devices.

For the dorsal support, a coating, more commonly a silicone matrix, is applied to the surface of a support and then crosslinked so as to render it nonadhesive with respect to the adhesive. Thus, the main two components are:
  the support material which is usually in paper or plastic film form. It physically supports, at the beginning and afterwards, the process of applying and forming a uniform layer of material with release properties. For economic reasons, the amount of material that is coated on must be minimized and this requirement can be carried out with a substrate which keeps at the surface most of the material coated on, and
  the release coating. It provides a very low surface free energy, almost entirely dispersive in nature, on the side that has been coated. The crosslinked silicone elastomer is the material universally used to create a layer with the required release properties.

The dorsal support has the role of supporting the self-adhesive multi-layer item per se during the production thereof and of protecting the adhesive layer against impurities, in such a way that it can pass through the transformation processes such as, for example, when it is a label: printing, cutting out, cutting, perforation, etc.

The adhesive used in this type of product is usually a pressure-sensitive adhesive (also known as self-adhesive glue or else PSA) which confers on the support coated therewith with an immediate sticking capacity at ambient temperature (often denoted "tack"), which allows instantaneous adhesion thereof to a substrate under the effect of a slight and brief pressure.

These self-adhesive multi-layer items can be prepared according to an "inline" process which involves the successive steps comprising in particular the depositing of a crosslinkable and/or polymerizable organopolysiloxane composition on a material of support type, the crosslinking and/or polymerization thereof by providing energy so as to form a silicone release coating, the application to this coating of an adhesive, generally in the form of an aqueous emulsion, the drying of this emulsion and the application of a second support. In practice, the level of depositing of a crosslinkable and/or polymerizable organopolysiloxane composition is between 0.1 and 5 $g/m^2$, which corresponds to thicknesses of about one micrometer for 1 $g/m^2$.

The self-adhesive multi-layer item thus formed is then generally stored for a more or less prolonged period on spools. Self-adhesive multi-layer items of this type are more particularly used for producing adhesive protective papers such as labels, decorative papers or adhesive tapes. The multi-layer system obtained is generally packaged by winding in the form of wide spools having a width of up to 2 m and a diameter of up to 1 m, which can thus be stored and transported.

The silicone release coatings based on curable and in particular irradiation-curable silicone, intended to detach from pressure-sensitive adhesives are therefore well known. In the 1980s, two irradiation-curable silicone-based systems appeared on the market. One system was an acrylate/silicone copolymer system curable by a free-radical mechanism under irradiation by both ultraviolet rays and electron beams. These systems are described, for example, in U.S. Pat. Nos. 4,201,808; 4,568,566; 4,678,846; 5,494,979; 5,510,190; 5,552,506; 5,804,301; 5,891,530 and 5,977,282.

The other system was an ultraviolet-ray-curable system, curing by a cationic mechanism and based on silicone polymers with an epoxy function. The systems of silicone polymers with an epoxy function are described, for example, in the U.S. Pat. Nos. 4,421,904; 4,547,431; 4,952,657; 5,217,805; 5,279,860; 5,310,601; 5,340,898; 5,360,833; 5,650,453; 5,866,264 and 5,973,020.

Given industrial coating rates, the crosslinking kinetics must be very fast in order to produce correct crosslinking, that is to say that the layer consisting of a silicone release elastomer must be sufficiently crosslinked to be able to perform its release function as well as possible and to have the desirable mechanical qualities. The assessment of the quality of the crosslinking of the silicone release layer can in particular be carried out by quantitative determination of the non-crosslinked extractable compounds, the amount of which must be as reduced as possible. For example, the content of extractables is preferably less than 8%, under normal industrial crosslinking conditions.

The nonadhesion of the free external face of the silicone coating is expressed through the detachment force, which must be weak and controlled, for the element intended to be placed on the support coated with the layer consisting of a silicone release elastomer. Conventionally, this element can be the adhesive face of a label or of a tape of the same kind.

Thus, in addition to this weak and controlled nonadhesion, the adhesion of the silicone coating to its support must be very high. This adhesion property is assessed for example by means of the rub-off trade test, which consists in rubbing the surface of the coating with a finger and in measuring the number of successive passes which result in damage to the coating.

The dorsal supports coated with a silicone release film can be, for example:
  a paper or a polymer film for protecting the adhesive face of a self-adhesive or pressure-sensitive adhesive element; or a polymer film of the polyolefin type (polyvinyl chloride (PVC), polypropylene or polyethylene) or of polyester type.

Curable silicone release compositions are applied to such supports, in such a way as to facilitate the removal of adhesive materials reversibly laminated on these supports. Formulations that can be crosslinked by free-radical polymerization can be used. They consist mainly of an acrylate-functionalized polyorganosiloxane and of a photoinitiator.

Radical photoinitiators are, inter alia, aromatic ketones which, after exposure under ultraviolet (UV) radiation:
- undergo homolytic cleavage in the α-position with respect to the carbonyl function with formation of two radical fragments, one of which is a benzoyl radical (type I photoinitiators), or
- form free radicals when they are promoted into their excited states by tearing a hydrogen away from a hydrogen donor molecule (more commonly denoted "co-initiator"), thereby resulting in the formation of an inactive cetyl radical and of an initiator radical derived from the corresponding donor (type II photoinitiators).

As examples of type II photoinitiators, mention may be made of isopropylthioxanthone (ITX), benzophenone and camphorquinone (CQ). As examples of co-initiators, mention may be made of: phenyltetrazolethiol, tris(trimethylsilyl)silane and aromatic amines such as ethyldimethylaminobenzoate (EDB).

As examples of type I photoinitiators, mention may be made of: α-hydroxyketones, benzoin ethers, and aromatic α-amino ketones.

As prior art, mention may be made of the granted patents FR2632960, EP0940422-B1, EP0979851-B1 and EP1544232-B1. Thus, said patents describe the use of (meth)acrylate-functionalized polysiloxanes as release-coating agents that can cure under the effect of radiation. The photoinitiator conventionally used is Irgacure® 1173 (formerly Darocur® 1173) from BASF. The photoinitiator Tego® A17 or its successor Tego® A18 from Evonik is used for silicone release coatings, as described in the RC Newsletter No. 2 brochure of September 2009 published by Evonik Industries.

The photoinitiators most widely used have the disadvantage of releasing, during polymerization and/or crosslinking under ultraviolet radiation, benzaldehyde suspected to be CMR and/or highly inflammable isopropanol.

For all these reasons, the self-adhesive multi-layer items using silicone release coatings by means of free-radical polymerization must be constantly improved.

SUMMARY

In this context, the first essential objective of the present invention is to develop a self-adhesive multi-layer item comprising a silicone release coating which does not use photoinitiators capable of being easily converted into a toxic or inflammable product and in particular of releasing benzaldehyde or isopropanol. It is desired to obtain coated substrates which do not have toxicity problems.

The second essential objective of the present invention is to provide a self-adhesive multi-layer item using a silicone release coating which has optimal properties in terms of content of extractables, of attachment to the support and of nonadhesion with respect to an adhesive.

Another essential objective of this invention is to provide a process for preparing a self-adhesive multi-layer item in accordance with the invention.

Another objective of this invention is to provide a silicone composition which is a precursor of a silicone release coating in accordance with the invention and which can be used in a self-adhesive multi-layer item.

The final objective of the invention relates to the use of the items in accordance with the invention in key industrial fields.

All these objectives, among others, are achieved by means of the present invention which relates to a self-adhesive multi-layer item comprising:
1) a dorsal support DO having a top face SI1 and a bottom face SI2,
2) at least one layer of silicone release coating RC applied on the top face SI1 of the dorsal support DO and which is prepared by irradiation of a curable silicone composition C not containing any solvent and comprising, as constituents:
a) at least one functionalized organopolysiloxane A comprising:
a1) at least one unit of formula (I) below:

$$R_a Z_b SiO_{(4-a-b)/2} \quad (I)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, or an alkoxy radical $-OR^4$ with $R^4$ being a hydrogen atom or a hydrocarbon-based radical comprising from 1 to 10 carbon atoms,
the symbols Z are monovalent radicals of formula -y-(Y')$_n$ in which:
y represents a linear or branched $C_1$-$C_{18}$ polyvalent alkylene radical optionally extended by $C_1$ to $C_4$ oxyalkylene or polyoxyalkylene divalent radicals, which is optionally substituted with a hydroxyl radical,
Y' represents an alkenylcarbonyloxy monovalent radical, and
n is equal to 1, 2 or 3, and
a is an integer equal to 0, 1 or 2, b is an integer equal to 1 or 2 and the sum a+b=1, 2 or 3; and
a2) optionally units of formula (II) below:

$$R_a SiO_{(4-a)/2} \quad (II)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, and
a is an integer equal to 0, 1, 2 or 3, and
b) an effective amount of at least one type I photoinitiator P of the family of acylphosphine oxide derivatives of formula (III) below:

in which formula:
the symbol $R^5$ is a monovalent radical $-O-R^8$ with the symbol $R^8$ being a hydrocarbon-based radical comprising from 1 to 8 carbon atoms;

the symbol $R^6$ is a phenyl radical optionally substituted with:
one or more halogen atom(s),
a hydrocarbon-based radical comprising from 1 to 8 carbon atoms,
a hydrocarbon-based alkoxy radical comprising from 1 to 8 carbon atoms, and/or
a hydrocarbon-based thio radical comprising from 1 to 8 carbon atoms; and
the symbol $R^7$ represents a hydrocarbon-based radical comprising from 1 to 12 carbon atoms, a benzyl radical or a phenyl radical optionally substituted with one or more halogen atom(s), a hydrocarbon-based radical comprising from 1 to 8 carbon atoms, a hydrocarbon-based alkoxy radical comprising from 1 to 8 carbon atoms and/or a cycloalkyl radical;
3) at least one adhesive PSA, preferably at least one pressure-sensitive adhesive PSA, applied on the layer of silicone release coating,
4) a frontal support FR applied on the adhesive PSA of the component 3), and
5) optionally at least one layer of silicone release coating RC applied on the bottom face SI2 of the dorsal support DO and which is prepared by application and irradiation of said curable silicone composition C, and on this same layer, there is at least one adhesive PSA, preferably at least one pressure-sensitive adhesive PSA.

DETAILED DESCRIPTION OF A PREFERRED EMBODIMENT

The components 5) are present in the self-adhesive and double-faced items.

In this context, the self-adhesive multi-layer item according to the invention simultaneously has the following advantages:
during its preparation, there is no release either of benzaldehyde or of isopropanol and therefore no health and safety risks for operators nor any environmental risks,
the silicone coating present in the item has good properties in terms of extractables, of attachment and of nonadhesion; and
the self-adhesive multi-layer item is long-lasting, namely its properties are preserved during storage.

It is to the inventor's credit to have judiciously selected the constituents of the curable silicone composition C used in the preparation of the item according to the invention and in particular said photoinitiator P according to the invention which makes it possible to produce release coatings which are effective on polymer supports, in particular polyester supports, for example PET supports. By virtue of the invention, during the preparation of the silicone release layer, in particular by crosslinking, under UV, neither benzaldehyde nor isopropanol is released and the coatings obtained have excellent attachment (rub-off), a minimized detachment force and good mechanical and physical properties.

Furthermore, the photoinitiator P according to the invention (acylphosphine oxide derivatives of formula (III)) has the advantage of also having an absorption band in the region from 350 to 420 nm, which makes its use very advantageous in the case of UV-crosslinking via light-emitting diode lamps, or UV LED lamps, which emit UV at the wavelengths 365 nm and/or 395 nm. The acronym "LED" is well known to those skilled in the art and is the abbreviation of the term "Light-Emitting Diode".

The performance levels achieved by virtue of the judicious choice of the components of the curable silicone composition C in terms of the quality of the crosslinking by free-radical polymerization: reactivity/level of crosslinking/kinetics, are entirely advantageous, as attested to by the low contents of extractables obtained.

It should be noted that the rub-off properties on a support are all the more positive since they endure for long periods, for example at least two weeks, this being under severe conditions, in particular in terms of humidity and temperature.

These advantageous characteristics can be particularly exploited for producing the nonadhesion of polymer supports, in particular polyester supports, for example PET supports, that are of use as liners of self-adhesive labels (pressure-sensitive adhesive), which are provided in the form of rolls or spools of films usually manufactured at very high speed.

This is all the more advantageous since these results are obtained with a silicone composition of which the rheological behavior of the silicone composition is not affected by the type of photoinitiator. Indeed, depending on the requirements, the viscosity of the curable silicone composition C can be modulated such that it is perfectly capable of being coated on any support and in particular on any flexible support and that it releases neither benzaldehyde nor isopropanol during crosslinking under UV.

According to one particular embodiment, the invention relates to a self-adhesive multi-layer item comprising:
1) a dorsal support DO having a top face SI1 and a bottom face SI2,
2) at least one layer of silicone release coating RC applied on the top face SI1 of the dorsal support DO and which is prepared by irradiation of a curable silicone composition C not containing any solvent and comprising as constituents:
a) at least one functionalized organopolysiloxane A comprising:
a1) at least one unit of formula (I) below:

$$R_a Z_b SiO_{(4-a-b)/2} \quad (I)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, or an alkoxy radical —$OR^4$ with $R^4$ being a hydrogen atom or a hydrocarbon-based radical comprising from 1 to 10 carbon atoms,
the symbols Z are monovalent radicals of formula -y-(Y')$_n$ in which:
y represents a linear or branched $C_1$-$C_{18}$ polyvalent alkylene radical optionally extended by $C_1$ to $C_4$ oxyalkylene or polyoxyalkylene divalent radicals, which is optionally substituted with a hydroxyl radical,
Y' represents an alkenylcarbonyloxy monovalent radical, and
n is equal to 1, 2 or 3, and
a is an integer equal to 0, 1 or 2, b is an integer equal to 1 or 2 and the sum a+b=1, 2 or 3; and
a2) optionally units of formula (II) below:

$$R_a SiO_{(4-a)/2} \quad (II)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, and a is an integer equal to 0, 1, 2 or 3, and b) an effective amount of at least one type I photoinitiator P of the family of acylphosphine oxide derivatives of formula (III) below:

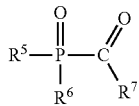

(III)

in which formula:

the symbol $R^5$ is a monovalent radical —O—$R^8$ with the symbol $R^8$ being a hydrocarbon-based radical comprising from 1 to 8 carbon atoms;

the symbol $R^6$ is a phenyl radical optionally substituted with:
one or more halogen atom(s),
a hydrocarbon-based radical comprising from 1 to 8 carbon atoms,
a hydrocarbon-based alkoxy radical comprising from 1 to 8 carbon atoms, and/or
a hydrocarbon-based thio radical comprising from 1 to 8 carbon atoms; and the symbol $R^7$ represents a hydrocarbon-based radical comprising from 1 to 12 carbon atoms, a benzyl radical or a phenyl radical optionally substituted with one or more halogen atom(s), a hydrocarbon-based radical comprising from 1 to 8 carbon atoms, a hydrocarbon-based alkoxy radical comprising from 1 to 8 carbon atoms and/or a cycloalkyl radical;

3) at least one adhesive PSA, preferably at least one pressure-sensitive adhesive PSA, applied on the layer of silicone release coating, 4) a frontal support FR applied on the adhesive PSA of the component 3), and 5) at least one layer of silicone release coating RC applied on the bottom face SI2 of the dorsal support DO and which is prepared by application and irradiation of said curable silicone composition C, and on this same layer, there is at least one adhesive PSA, preferably at least one pressure-sensitive adhesive PSA.

Another subject of the invention relates to a self-adhesive multi-layer item comprising:

1) a dorsal support DO having a top face SI1 and a bottom face SI2, 2) at least one layer of silicone release coating RC applied on the top face SI1 of the dorsal support DO and which is prepared by irradiation of a curable silicone composition C not containing any solvent and comprising as constituents:

a) at least one functionalized organopolysiloxane A comprising:
a1) at least one unit of formula (I) below:

$$R_a Z_b SiO_{(4-a-b)/2}$$ (I)

in which formula:

the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, or an alkoxy radical —$OR^4$ with $R^4$ being a hydrogen atom or a hydrocarbon-based radical comprising from 1 to 10 carbon atoms, the symbols Z are monovalent radicals of formula -y-(Y')$_n$ in which:
y represents a linear or branched $C_1$-$C_{18}$ polyvalent alkylene radical optionally extended by $C_1$ to $C_4$ oxyalkylene or polyoxyalkylene divalent radicals, which is optionally substituted with a hydroxyl radical,
Y' represents an alkenylcarbonyloxy monovalent radical, and
n is equal to 1, 2 or 3, and
a is an integer equal to 0, 1 or 2, b is an integer equal to 1 or 2 and the sum a+b=1, 2 or 3; and a2) optionally units of formula (II) below:

$$R_a SiO_{(4-a)/2}$$ (II)

in which formula:

the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, and a is an integer equal to 0, 1, 2 or 3, and b) an effective amount of at least one type I photoinitiator P of the family of acylphosphine oxide derivatives of formula (III) below:

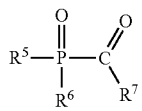

(III)

in which formula:

the symbol $R^5$ is a monovalent radical —O—$R^8$ with the symbol $R^8$ being a hydrocarbon-based radical comprising from 1 to 8 carbon atoms;

the symbol $R^6$ is a phenyl radical optionally substituted with:
one or more halogen atom(s),
a hydrocarbon-based radical comprising from 1 to 8 carbon atoms,
a hydrocarbon-based alkoxy radical comprising from 1 to 8 carbon atoms, and/or
a hydrocarbon-based thio radical comprising from 1 to 8 carbon atoms; and the symbol $R^7$ represents a hydrocarbon-based radical comprising from 1 to 12 carbon atoms, a benzyl radical or a phenyl radical optionally substituted with one or more halogen atom(s), a hydrocarbon-based radical comprising from 1 to 8 carbon atoms, a hydrocarbon-based alkoxy radical comprising from 1 to 8 carbon atoms and/or a cycloalkyl radical;

3) at least one adhesive PSA, preferably at least one pressure-sensitive adhesive PSA, applied on the bottom face SI2 of the dorsal support DO.

Preferably, the effective amount of photoinitiator P is between 0.1% and 20% by weight relative to the weight of the functionalized organosiloxane or organopolysiloxane A, and preferably between 0.1% and 10% by weight relative to the weight of the functionalized organosiloxane or organopolysiloxane A and even more preferentially between 0.1% and 5% by weight relative to the weight of the functionalized organosiloxane or organopolysiloxane A.

Effective examples of photoinitiators P are those described in patent application EP0007508. Preferably, the photoinitiator P is chosen from the group made up of the derivatives (chemical names): 2,2-dimethylpropionyldiphenylphosphine oxide, 2,2-dimethylheptanoyldiphenylphosphine oxide, 2,2-dimethyloctanoyldiphenylphosphine oxide, 2,2-dimethylnonanoyldiphenylphosphine oxide, methyl 2,2-dimethyloctanoyl-phenylphosphinate, 2-methyl-2-ethylhexanoyldiphenylphosphine oxide, 1-methyl-1-cyclohexanecarbonyldiphenylphosphine oxide, 2,6-dimethylbenzoyldiphenylphosphine oxide, 2,6-dimethoxybenzoyldiphenylphosphine oxide, 2,6-dichlorobenzoyldiphenylphosphine oxide, methyl 2,6-dimethoxybenzoylphenylphosphinate, 2,4,6-trimethylbenzoyldiphenylphosphine oxide, methyl 2,4,6-trimethylbenzoylphenylphosphinate, 2,3,6-trimethylbenzoyldiphenylphosphine oxide, 2,3,5,6-tetramethylbenzoyldiphenylphosphine oxide, 2,4,6-trimethoxybenzoyldiphenylphosphine oxide, 2,4,6-trichlorobenzoyldiphenylphosphine oxide, 2-chloro-6-methylthiobenzoyldiphenylphosphine oxide, methyl 2,4,6-trimethylbenzoylnaphthylphosphinate, 1,3-dimethoxynaphthalene-2-carbonyldiphenylphosphine oxide, and 2,8-dimethoxynaphthalene-1-carbonyldiphenylphosphine oxide.

According to one particularly preferred embodiment, the photoinitiator P is ethyl (2,4,6-trimethylbenzoyl)phenylphosphinate (CAS No. 84434-11-7).

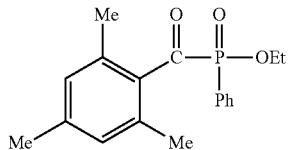 [SMILES: CCOP(=O)(C(=O)c1c(C)cc(C)cc1C)c1ccccc1]

According to one preferred embodiment, it will be possible to combine, with the photoinitiator P, a polymeric co-initiator, for instance Genopol-AB-1 (from the company Rhan) which is a polymeric aminobenzoate derivative. The amounts will depend on the amount of photoinitiator P used (photoinitiator P/co-initiator weight ratio of between 5:1 and 1:5).

It is understood that, in formulae (I) and (II) described above for the functionalized organosiloxane or organopolysiloxane A, if several radicals R are present, they may be identical to or different than one another. Furthermore, in formulae (I) and (II), the symbol R can advantageously represent a monovalent radical chosen from the group made up of: methyl, ethyl, propyl, 3,3,3-trifluoropropyl, xylyl, tolyl and phenyl.

The organopolysiloxane A can have a linear, branched, cyclic or network structure. When it is a question of linear organopolysiloxanes, they can essentially consist:
of siloxyl units "D" chosen from the units of formulae $R_2SiO_{2/2}$, $RZSiO_{2/2}$ and $Z_2SiO_{2/2}$;
of siloxyl units "M" chosen from the units of formulae $R_3SiO_{1/2}$, $R_2ZSiO_{1/2}$, $RZ_2SiO_{1/2}$ and $Z_3SiO_{1/2}$, and
the symbols R and Z are as defined above.

By way of examples of nonfunctionalized units "D", mention may be made of the siloxyl units dimethylsiloxy or methylphenylsiloxy and, by way of examples of nonfunctionalized units "M", mention may be made of the siloxyl units trimethylsiloxy and dimethylphenylsiloxy.

To continue the nonlimiting definition of the functionalized organosiloxane or organopolysiloxane A, it is specified that, for the symbol Z of the alkenylcarbonyloxy examples of radicals Y', mention may be made of acryloxy [$CH_2$=CH—CO—O—] and methacryloxy radicals: [($CH_3$)CH=CH—CO—O—] and [$CH_2$=C($CH_3$)—CO—O—].

By way of illustration of the symbol y, mention shall be made of the radicals:

—$CH_2$—;

—$(CH_2)_2$—;

—$(CH_2)_3$—;

—$CH_2$—CH($CH_3$)—$CH_2$—;

—$(CH_2)_3$—NH—$CH_2$—$CH_2$—;

—$(CH_2)_3$—O$CH_2$—;

—$(CH_2)_3$—[O—$CH_2$—CH($CH_3$)—]—;

—$(CH_2)_3$—O—$CH_2$—CH(OH)(—$CH_2$—);

—$(CH_2)_3$—O—$CH_2$—C($CH_2$—$CH_3$)[—$(CH_2)_2$—]$_2$; and

—$(CH_2)_2$—$C_6H_9$(OH)—.

Preferably, the functionalized organosiloxane or organopolysiloxane A has the formula (IV) below:

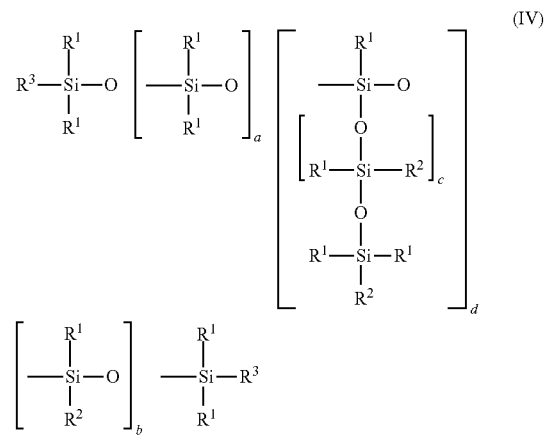

in which formula:
the symbols $R^1$, which may be identical or different, each represent a linear or branched $C_1$ to $C_{18}$ alkyl group, a $C_6$ to $C_{12}$ aryl or aralkyl group, which is optionally substituted, preferably with halogen atoms, or an alkoxy radical —$OR^4$ with $R^4$ being a hydrogen atom or a hydrocarbon-based radical comprising from 1 to 10 carbon atoms, the symbols $R^2$ and $R^3$, which may be identical or different, each represent either a radical $R^1$ or a monovalent radical of formula Z=-y-(Y')$_n$ in which:

y represents a linear or branched $C_1$-$C_{18}$ alkylene polyvalent radical optionally extended with $C_1$ to $C_4$ oxyalkylene or polyoxyalkylene divalent radicals, optionally substituted with a hydroxyl radical, Y' represents an alkenylcarbonyloxy monovalent radical, and n is equal to 1, 2 or 3, and with a=0 to 1000, b=0 to 500, c=0 to 500, d=0 to 500 and a+b+c+d=0 to 2500, and with the proviso that at least one symbol $R^2$ or $R^3$ represents the monovalent radical of formula Z.

According to one preferred embodiment, in formula (IV) above:

c=0, d=0, a=1 to 1000, b=1 to 250, the symbol $R^2$ represents the monovalent radical of formula Z and the symbols $R^1$ and $R^3$ have the same meaning as above.

Even more preferentially, in formula (IV) above:

c=0, d=0, a=1 to 500, b=1 to 100, the symbol $R^2$ represents the monovalent radical of formula Z and the symbols $R^1$ and $R^3$ have the same meaning as above.

These functionalized organopolysiloxanes A, in particular when they are linear, can be oils having a dynamic viscosity at 25° C. of between 1 mPa·s and 100 000 mPa·s, preferentially between 5 mPa·s and 10 000 mPa·s and even more preferentially between 10 mPa·s and 5000 mPa·s.

According to one particularly preferred embodiment, the functionalized organopolysiloxane A is preferentially chosen in such a way that the curable silicone composition C advantageously has a viscosity which does not exceed 5000 mPa·s, preferably does not exceed 4000 mPa·s at 25° C. By way of variant, compositions of which the viscosity is between 200 and 1000 mPa·s at 25° C. will be preferred.

All the viscosities to which reference is made in the present disclosure correspond to a magnitude of dynamic viscosity at 25° C. termed "Newtonian", that is to say the dynamic viscosity which is measured, in a manner known per se, with a Brookfield viscometer at a shear rate gradient which is sufficiently low for the viscosity measured to be independent of the shear rate gradient.

The synthesis of the functionalized organosiloxane or organopolysiloxane A is described in many patents. Mention may be made, for example, of patents FR2362960, EP940422B1, EP979851B1, EP1276825B1, U.S. Pat. No. 3,782,940 and EP1544232B1.

Any pressure-sensitive adhesive can be used as adhesive and in particular as pressure-sensitive adhesive PSA that is of use according to the invention. A description of the pressure-sensitive adhesives that can be used will be found in the Encyclopedia of Polymer Science and Engineering, vol. 13, Wiley-Interscience Publishers (New York, 1988). An additional description of pressure-sensitive adhesives that can be used will be found in the Encyclopedia of Polymer Science and Technology, vol. 1, Interscience Publishers (New York, 1964). In general, the PSAs used herein may be any one of the PSAs described in the abovementioned references. According to one embodiment of the invention, the PSAs comprise natural or synthetic elastomers or acrylic material-based adhesives. Examples are described in U.S. Pat. Nos. 5,164,444, 5,623,011 and 6,306,982. The adhesive can also be rubber-based, such as those described in U.S. Pat. No. 5,705,551 and in particular made of natural rubber. It may also be a radiation-curable mixture of monomers with initiators and other ingredients, such as those described in U.S. Pat. Nos. 5,232,958 and 5,232,958. The pressure-sensitive adhesives that are of use according to the invention are preferably in emulsion and hot-melt adhesives. Usual pressure-sensitive adhesives can be used, including silicone-based pressure-sensitive adhesives, rubber-based pressure-sensitive adhesives and acrylic material-based pressure-sensitive adhesives.

Preferably, the pressure-sensitive adhesive is an acrylic adhesive in aqueous emulsion which is composed of acrylic homopolymers or copolymers in aqueous emulsion. It usually contains between 40% and 60% of solids. It has viscosities of between 0.3 and 0.6 Pa.s. It has the advantage of not containing organic solvents (non-inflammable and no evaporation of harmful solvent).

The acrylic-based pressure-sensitive adhesives are particularly very suitable in terms of cost, durability, pressure-sensitive adhesion characteristics, etc. As pressure-sensitive acrylic adhesives, mention may be made as basic polymer of those which comprise a copolymer or copolymer of (meth) acrylic acid alkyl ester which contains an alkyl group having from 4 to 12 carbon atoms as main component. Examples of (meth)acrylic acid alkyl ester are butyl (meth)acrylate, isobutyl (meth)acrylate, hexyl (meth)acrylate, 2-hexyl (meth)acrylate, isononyl (meth)acrylate and isodecyl (meth) acrylate. In addition to the main component above, the basic polymer can be polymerized with monomer components, for example (meth)acrylic acid alkyl esters which contain an alkyl group that has from 1 to 3 carbon atoms, acrylic acid, methacrylic acid, vinyl acetate, acrylonitrile, methacrylonitrile and styrene, as required. In addition, it is possible to formulate other pressure-sensitive adhesives with various additives. For the acrylic-based pressure-sensitive adhesives, it is possible to add resins which confer adhesion to the touch, for example petroleum resins, terpene resins, rosin resins, coumarone-indene resins and phenol resins, and also crosslinking agents such as isocyanate-based crosslinking agents and epoxy-based crosslinking agents. Furthermore, it is advantageously possible to add various additives, such as stabilizers and fillers. They are colorless and stable with respect to storage and to aging (low UV-sensitivity, low sedimentation). Their slightly polar natures allow good wetting of the surfaces to be bonded and they have good adhesion performance levels. This type of adhesive is formulated by emulsion polymerization wherein, mixed together in an aqueous medium, are one or more acrylic monomers, a reaction initiator and a surfactant in order to stabilize the emulsion micelles. As reaction initiator, two types are very widely used: thermal (potassium peroxodisulfate or ammonium peroxodisulfate) or redox (bisulfate). The final amount of water of the emulsion varies between 40% and 60%. When it is applied in the form of an aqueous emulsion, the adhesive is therefore dried in order to form an adhesive layer.

Fillers can also be added to the adhesives in order to increase the volume of the adhesive and/or to improve the properties. Fillers are commonly used in adhesive formulations for the following main reasons:

(1) to reduce the cost, for example by adding calcium carbonate, clay or talc;

(2) to color the adhesives, for example by virtue of the addition of titanium dioxide, of a color toner and of safety markers; and (3) to increase the performance level, for example by increasing the rigidity and the tensile strengths, by reducing cold flow, by reducing lateral flow, improved cutting, etc.

Non-reinforcing inert fillers are distinguished from reinforcing active fillers:

non-reinforcing inert fillers are fillers which do not react with the adhesive, for instance: untreated clay, talc, calcium carbonate and titanium dioxide. They are added to the adhesive in order to increase the volume of the adhesive, to reduce the cost or to modify the appearance or the chemical resistance of the adhesive;

reinforcing active fillers are those which react with the adhesive, for example while promoting additional crosslinking or charge-polymer interfacial interaction. Examples of such fillers comprise surface-treated clay, zinc oxide, silica which has fine particles, and carbon black. This allows an increase in the mechanical properties, such as the tensile strength or the modulus and, where appropriate, the adhesive properties.

In tape applications, the layer of adhesive can be between a few hundred micrometers and a few thousand micrometers thick.

In label applications (generally the thickness of the adhesive layer is less than 100 micrometers), considerable amounts of fillers cause, however, a significant loss of tack. Consequently, the amount of filler used for this application is more limited and will be chosen judiciously in order to avoid this problem.

As an example of a dorsal support DO, use may be made of papers, films of synthetic resin, for example made of polyethylene, of polypropylene and of poly(ethylene terephthalate), sheets of rubber, fabrics, nonwoven fabrics, canvasses, expanded sheets, metal films and laminates thereof.

According to one preferred embodiment, the dorsal support DO is chosen from the group made up of: polymer films and papers.

As examples of paper dorsal supports DO that are of use according to the invention, mention may be made of: calendered papers, kaolin-coated papers and polyethylene-coated papers. In particular, use may also be made of similar cellulose-based materials prepared by means of methods such as processes with sodium hydroxide, with sulfite or with sulfate (kraft), the neutral sulfide curing process, the chloralkali processes, nitric acid processes, semi-chemical processes, and the like. Mention may be made of, as examples of papers that can be used as substrates for preparing the composite laminates of the present invention, of kraft papers such as bleached kraft papers of 40 pounds and 50 pounds, offset-quality bleached kraft paper of 41 pounds, and the like.

As other examples of dorsal supports DO, mention may be made of those which are made of a polymer film, for example of: vinyl polymer, poly(vinyl chloride), polyester (for example of polyethylene terephthalate) and polyolefin (polyethylene such as LDPE, and polypropylene including biaxially oriented polypropylene), but also nonwoven fabrics made of polyester or of cellulose-based fibers and polyurethane foams or polyethylene foams.

According to one particular embodiment, the dorsal support DO is chosen from the group made up of polyester films and kraft papers. As an example of kraft paper, mention may be made of supercalendered kraft paper or of crystal paper, which is also a kraft paper but is more densified.

Examples of frontal supports FR are, for example, cellulose-based derivatives such as labels, metal sheets, polycarbonates or films made of: vinyl polymer, poly(vinyl chloride), polyester (for example of polyethylene terephthalate) and polyolefin (polyethylene and polypropylene including biaxially oriented polypropylene).

According to one particular embodiment, the frontal support FR is chosen from the group made up of: cellulose-based derivatives, such as labels, metal sheets, polycarbonates, polyethylene films, polyethylene terephthalate films, polypropylene films and vinyl films.

According to one preferred embodiment, the self-adhesive multi-layer item is characterized in that it is a self-adhesive label or a self-adhesive tape.

Another subject of the invention relates to the curable silicone composition C as defined above.

In particular, the invention also relates to an irradiation-curable silicone composition C which does not contain any solvent and which comprises as constituents:
a) at least one functionalized organosiloxane or organopolysiloxane A comprising:
a1) at least one unit of formula (I) below:

$$R_a Z_b SiO_{(4-a-b)/2} \quad (I)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, or an alkoxy radical —$OR^4$ with $R^4$ being a hydrogen atom or a hydrocarbon-based radical comprising from 1 to 10 carbon atoms,
the symbols Z are monovalent radicals of formula -y-(Y')$_n$ in which:
y represents a linear or branched $C_1$-$C_{18}$ polyvalent alkylene radical optionally extended by $C_1$ to $C_4$ oxyalkylene or polyoxyalkylene divalent radicals, which is optionally substituted with a hydroxyl radical,
Y' represents an alkenylcarbonyloxy monovalent radical, and
n is equal to 1, 2 or 3, and
a is an integer equal to 0, 1 or 2, b is an integer equal to 1 or 2 and the sum a+b=1, 2 or 3; and
a2) optionally units of formula (II) below:

$$R_a SiO_{(4-a)/2} \quad (II)$$

in which formula:
the symbols R, which may be identical or different, each represent a linear or branched $C_1$ to $C_{18}$ alkyl group, a $C_6$ to $C_{12}$ aryl or aralkyl group, which is optionally substituted, preferably with halogen atoms, and
a is an integer equal to 0, 1, 2 or 3, and
b) an effective amount of at least one type I photoinitiator P of the family of acylphosphine oxide derivatives of formula (III) below:

in which formula:
the symbol $R^5$ is a monovalent radical —O—$R^8$ with the symbol $R^8$ being a hydrocarbon-based radical comprising from 1 to 8 carbon atoms;
the symbol $R^6$ is a phenyl radical optionally substituted with:
one or more halogen atom(s),
a hydrocarbon-based radical comprising from 1 to 8 carbon atoms,
a hydrocarbon-based alkoxy radical comprising from 1 to 8 carbon atoms, and/or
a hydrocarbon-based thio radical comprising from 1 to 8 carbon atoms; and
the symbol $R^7$ represents a hydrocarbon-based radical comprising from 1 to 12 carbon atoms, a benzyl radical or a phenyl radical optionally substituted with one or more halogen atom(s), a hydrocarbon-based radical comprising from 1 to 8 carbon atoms, a hydrocarbon-based alkoxy radical comprising from 1 to 8 carbon atoms and/or a cycloalkyl radical.

As indicated above, the preferred photoinitiator P is ethyl (2,4,6-trimethylbenzoyl)phenylphosphinate.

The irradiation-curable silicone compositions C used according to the invention can also comprise other ingredients, such as adhesion modulators which make it possible to increase or decrease the adhesion forces obtained using the polyorganosiloxane alone, pigments, photosensitizers, fungicidal, bactericidal and antimicrobial agents, corrosion inhibitors, etc.

Another subject of the invention relates to a process for preparing a self-adhesive multi-layer item according to the invention and as defined above, comprising the following steps a) to d):
- a) a composition C according to the invention and as defined above is prepared by mixing its constituents;
- b) between 0.1 and 5 g per m² of the composition C obtained in the preceding step are applied to the top face SI1 of a dorsal support DO in order to obtain the dorsal support DO coated with the composition C,
- c) then the dorsal support DO coated with the composition C is subjected to ultraviolet radiation in order to cure, by polymerization and/or crosslinking, the composition C making it possible to obtain a layer of silicone release coating RC, and
- d) a step d1) or d2) is carried out:
  - d1) at least one adhesive PSA, preferably one pressure-sensitive adhesive PSA, is applied on the layer of silicone release coating RC, then a frontal support FR is applied on the adhesive PSA,
  - d2) an adhesive construction AD is prepared by applying, on a frontal support FR, at least one adhesive PSA, preferably one pressure-sensitive adhesive PSA, then the adhesive construction AD is joined with the dorsal support DO coated with the composition C prepared in step c) in such a way that the adhesive PSA is located between the dorsal support DO and the frontal support FR, and
- e) optionally, the composition C obtained in step a) is also applied on the bottom face SI2 of the dorsal support DO and is then subjected to ultraviolet radiation in order to cure, by polymerization and/or crosslinking, the composition C, making it possible to obtain a layer of silicone release coating RC on the bottom face SI2 of the dorsal support DO, and subsequently at least one adhesive PSA, preferably at least one pressure-sensitive adhesive PSA, is applied on this same layer of silicone release coating RC.

According to one advantageous variant of the invention, the process according to the invention is characterized in that, in step d) and/or e), the adhesive PSA, preferably a pressure-sensitive adhesive PSA, is applied in the form of an aqueous emulsion and then is dried.

The amounts of the composition C according to the invention deposited on the supports are variable and are usually between 0.1 and 5 g per m² of surface treated. These amounts depend on the nature of the supports and of the desired release properties. They are more commonly between 0.3 and 1.5 g/m² for nonporous supports.

Preferably, during step a) of the process according to the invention, the effective amount of photoinitiator P is between 0.1% and 5% by weight relative to the weight of the functionalized organosiloxane or polyorganosiloxane A, and preferably between 0.1% and 3% by weight relative to the weight of the functionalized organosiloxane or organopolysiloxane A.

The UV radiation used has a wavelength of between 100 and 400 nanometers. The irradiation time can be short and it is generally less than 1 second and is about a few tenths of a second for very small thicknesses of compositions deposited on the surfaces. The crosslinking is advantageously carried out in the absence of any heating. However, heating between 25 and 100° C. is not excluded from the invention.

Furthermore, it is possible to adjust the curing time, in particular through the number of UV lamps used, through the UV exposure time and through the distance between the composition and the UV lamp.

According to one advantageous embodiment, LED UV lamps are used (UV emissions at 365, 375, 385 and/or 395 nm).

The crosslinking, which results in curing of the curable silicone composition C, can be carried out continuously by passing the support coated with the composition through irradiation equipment which is designed to give the coated support a residence time that is sufficient to complete the curing of the coating. The curing must generally be carried out in the presence of the lowest possible oxygen concentration, conventionally at an oxygen concentration of less than 100 ppm, and preferably less than 50 ppm. The curing is generally carried out in an inert atmosphere, for example of nitrogen or argon. The exposure time required to cure the curable silicone composition C varies with factors such as:
- the particular formulation used, the type and the wavelength of the radiation,
- the dose rate, the energy flow,
- the photoinitiator concentration, and
- the atmosphere and the thickness of the coating.

For the curing by ultraviolet rays, an ultraviolet-ray dose in the range of from approximately 0.1 to approximately 0.5 joule is generally sufficient. The exposure time is generally very brief and the curing is carried out in a time ranging from approximately 0.1 second to approximately 3 seconds. The actual exposure time required to obtain appropriate curing may be easily determined by those skilled in the art.

The compositions are applied using devices capable of uniformly depositing small amounts of liquids. For this purpose, it is possible to use, for example, the device called "Helio glissant" comprising in particular two superposed rolls: the role of the lowest roll, which dips into the coating tank containing the composition, is to impregnate the highest roll with a very thin layer, while the role of the latter is to deposit on the support the desired amounts of composition with which it is impregnated; such metering is obtained by adjusting the respective speed of the two rolls which rotate in opposite directions to one another. It is also possible to use any other technique known to those skilled in the art, such as: curtain coating, brush coating, spraying, inverted-roller coating, knife coating, etc.

According to one preferred embodiment, the process according to the invention is characterized in that, in step c), the ultraviolet radiation has a wavelength of between 100 and 400 nanometers, limits included.

Another subject of the invention relates to a substrate at least partially coated with a release coating prepared by application of the curable silicone composition C according to the invention and as defined above and irradiation by ultraviolet radiation so as to bring about the crosslinking thereof.

Another subject of the invention relates to the use of a substrate at least partially coated with a release coating according to the invention and as defined above, in the field of self-adhesive labels, of bands including envelopes, of graphic arts, of medical and hygiene care and of construction and insulation.

Finally, the last subject of the invention relates to the use of a self-adhesive multi-layer item according to the invention and as defined above or of the irradiation-curable silicone composition C according to the invention and as defined above, in the field of self-adhesive labels, of bands including envelopes, of graphic arts, of medical and hygiene care and of construction and insulation.

According to one variant of the invention, when the term "comprising" is used to describe the self-adhesive multi-layer items, the processes and the silicone compositions according to the invention, it can be replaced with the term "consisting of" without destroying the meaning of the invention.

The following examples and tests are given by way of nonlimiting illustration. They make it possible in particular to understand the invention more clearly and to reveal all its advantages and glimpse some implementation variants.

EXAMPLE

The compositions are prepared by mixing one or more silicone oils A according to formula (IV) described above and a photoinitiator P, the structures of which are given in detail below.

TABLE 2

| Photoinitiators | |
|---|---|
| Photoinitiators | Structures |
| P1 = Irgacure ® 1173 from BASF | (structure shown) |
| P2 = Tego ® A18 from Evonik | |
| P3 = (ethyl (2,4,6-trimethylbenzoyl)phenyl-phosphinate) CAS No. 84434-11-7 | (structure shown) |

Coating Process

The silicone compositions are coated by means of a Rotomec coating controller on various supports (polyester or polypropylene). The machine speed is 50 or 100 m/min with a mercury lamp power fixed at 100 W/cm for carrying out the crosslinking under UV. This depositing is controlled by XRF measurement. At the outlet of the machine, the tests carried out are the "smear", the "rub-off", the "dewetting" and the measurement of silicone extractables.

TABLE 1

Structures of the acryloxy-functionalized organopolysiloxanes

| Compound A | $R^1$ | $R^2$ | $R^3$ | a | b | d | c |
|---|---|---|---|---|---|---|---|
| A1 | $CH_3$ | —(CH$_2$)$_3$—O—CH$_2$—CH(OH)—CH$_2$—O—C(O)—CH=CH$_2$ | $CH_3$ | 85 | 7 | 0 | 0 |
| A2 | $CH_3$ | —(CH$_2$)$_3$—O—CH$_2$—CH(OH)—CH$_2$—O—C(O)—CH=CH$_2$ | $CH_3$ | 220 | 4 | 0 | 0 |
| A3 | $CH_3$ | —(CH$_2$)$_3$—O—CH$_2$—CH(OH)—CH$_2$—O—C(O)—CH=CH$_2$ | $CH_3$ | 16 | 5 | 0 | 0 |
| A4 | $CH_3$ | —(CH$_2$)$_3$—O—C(O)—CH=CH$_2$ | —(CH$_2$)$_3$—O—C(O)—CH=CH$_2$ | 90 | 4 | 0 | 0 |
| A5 | $CH_3$ | Not present in the formula | —(CH$_2$)$_3$—O—CH$_2$—C(CH$_2$O—C(O)—CH=CH$_2$)(CH$_2$—CH$_3$)(CH$_2$O—C(O)—CH=CH$_2$) | 80 | 0 | 0 | 0 |

Tests Carried Out on the Supports Coated with Silicone Release Coatings:

Deposit: Testing of the silicone deposit coated on the surface by silicon X-ray fluorescence analysis (Lab-X 3000 from Oxford). An X-ray tube excites the electron layer of the silicon atoms, which causes an X-ray emission proportional to the amount of silicon excited. This value or number of counts is converted by calculation (using the calibration line) into an amount of silicone.

Smear: Qualitative testing of the surface polymerization by the finger trace method which consists in:
  placing the sample of support coated with silicone to be tested on a flat and rigid surface;
  making a trace with the end of the finger by pressing moderately but firmly; and
  examining by eye the trace thus made, preferably in low-angle light. The presence of even a very slight trace can thus be seen by the difference in shininess of the surface.

The assessment is qualitative. The "Smear" is quantified with the following grades:
  A: very good, no trace of a finger
  B: slightly less good, trace barely visible
  C: clear trace
  D: very clear trace and oily appearance of the surface, product barely polymerized, that is to say a grade of A to D, from the best result to the poorest.

Rub-off: Testing of the ability of the silicone to adhere to the flexible support by scrubbing by moving the finger back and forward, which consists in:
  placing the sample of support coated with silicone to be tested on a flat and rigid surface, the silicone being on the upper face.
  moving the end of the finger back and forward ten times (along a length of approximately 10 cm) while moderately but firmly pressing.
  examining by eye the appearance of the scrubbing. The scrubbing corresponds to the appearance of a fine white powder or of small balls which roll under the finger.

The assessment is qualitative. The scrubbing is quantified with the following grades:
  10: very good, no appearance of scrubbing after 10 back and forward movements
  1: very poor, scrubbing from the first backward movement.

The grade corresponds to the number of back and forward movements (from 1 to 10) starting from which scrubbing appears.

That is to say a grade of 1 to 10, from the worst to the best result.

Dewetting: Assessment of the degree of polymerization of the silicone layer by evaluation of the transfer of silicone onto an adhesive brought into contact with the coating by means of an ink with a standardized surface tension. The method is as follows:
  Select a sample of approximately 20×5 cm of the silicone-coated paper to be characterized, taken in the direction of unwinding (machine direction).
  Cut a length of ≈ 15 cm of adhesive tape, then place it adhesive side down on the paper to be tested, without folds, while exerting a pressure ten times by sliding the finger along the length of the adhesive tape ("Scotch" 3 M adhesive tape, reference 610, width: 25 mm).
  Remove the adhesive tape and deposit it flat, adhesive-treated part upward.
  With a (disposable) cotton bud, deposit on the adhesive-treated part of the tape a trace of ink along a length of approximately 10 cm (inks of the brand Sherman or Ferarini and Beneli having a surface tension ≈ 30 dynes/cm and a viscosity of 2 to 4 mPa/s). Immediately start the timer.
  It is considered that the dewetting phenomenon phase has been entered when the line of ink changes appearance, then stop the timer.
  The depositing of the ink on the adhesive-treated part of the tape must be done within 2 minutes following the silicone coating.
  If the result obtained is <10 seconds, it is considered that there is migration of silicone on the adhesive, and that the polymerization is not complete.
  A grade of 0 to 10 corresponding to the time elapsed in seconds before the observation of the dewetting phenomenon will be given.
  If the result obtained is 10 seconds, it is considered that the polymerization is complete. In this case, a grade of 10 will be given, meaning that the result is very good.
  Note the grade obtained and the ink used (name, brand, surface tension, viscosity).

Extractables: Measurement of the amount of silicone which is not grafted to the network formed during polymerization. These silicones are extracted from the film by immersion of a sample, in MIBK for a minimum period of 24 h, as soon as said sample has exited the machine. This is measured by flame absorption spectroscopy.

Preparation of Self-Adhesive Multi-Layer Items

Standardized adhesive-treated supports TESA7475 (support=PET–adhesive=acrylic) and TESA4651 (support=acrylic-coated cloth–adhesive=natural rubber) are complexed on the silicone liner produced above (=support coated with a silicone coating obtained by crosslinking under UV) in order to form a multi-layer item. Tensile tests are carried out in order to determine the detachment forces before and after aging and also the values of subsequent adhesion and of loop-tack. These tests are described hereinafter.

Test Carried Out on the Multi-Layer Items Obtained

Subsequent adhesion ("SubAd" in the tables): Measurement of verification of the preservation of adhesivity of the adhesives (TESA 7475) having been in contact with the silicone coating according to the FINAT 11 test (FTM 11) known to those skilled in the art. In this case, the reference test specimen is PET and the adhesives remained in contact with the silicone surface to be tested for 1 day at 70° C. and 7 days at 70° C.

The results are expressed in % preservation of adhesive force of the reference tape: $CA=(Fm2/Fm1)\times100$ in with:
  Fm2=Mean tape detachment forces after 20 h contact with silicone-treated support; and
  Fm1=Mean tape detachment forces without contact with silicone-treated support.

Loop-tack: The loop-tack test consists of the determination of the force required to separate, at 300 mm/min, a loop of adhesive (TESA 7475) brought into contact, with no pressure, with a standard material. The ratio of the result between a clean adhesive and an adhesive complexed for 1 day at 23° C. makes it possible to assess the loss of adhesivity according to the FINAT 9 (FTM9) test known to those skilled in the art.

The final result will be the mean of the three measurements expressed in N/Inch (unit: 1 inch=2.54 cm).

Release: The measurements of peeling forces were carried out with the standardized adhesives TESA 4651 and TESA 7475. The test specimens of the multi-layer item (adhesive in contact with silicone surface) were stored for 1 day at 23° C., 1 day at 70° C. and 7 days at 70° C. under the required pressure conditions, then tested at low peeling speed according to the FINAT 3 (FTM 3) test known to those skilled in the art.

The detachment force is expressed in cN/inch and is measured using a dynamometer, after placing the samples under pressure either at ambient temperature (23° C.) or at a higher temperature for accelerated aging tests (generally 70° C.).

The results are reported in table 3 below.

TABLE 3

Results of the evaluation of the multi-layer items. Coatings obtained using silicone oil comprising pendant acrylate functions.

| Item | Comparative example 1 | Comparative example 2 | Example 1 (invention) |
|---|---|---|---|
| Composition | | | |
| A1 | 100 | 100 | 100 |
| P1 | 1 | | |
| P2 | | 1 | |
| P3 | | | 1 |
| Support | Lumirror polyester film | | |
| | Speed 100 m/min | | |
| | Lamp 100 W/cm | | |
| Deposit (g/m$^2$) | 1.07 | 1.09 | 1.05 |
| Reaction by-product: benzaldehyde | yes | no | no |
| Reaction by-product: isopropanol | yes | yes | no |
| Coating characterization | | | |
| Smear | A | A | A |
| Rub-off | 10 | 10 | 10 |
| Dewetting | 10 | 10 | 10 |
| Extractables (100 cm$^2$) (%) | 3.05 | 3.42 | 3.45 |
| Multi-layer item characterization | | | |
| SubAd 1 d@70° C. (ref TESA 7475) | 1.0 | 1.0 | 1.0 |
| SubAd 1 d@70° C. (%) | 90 | 89 | 89 |
| SubAd 7 d@70° C. (ref TESA 7475) | 0.94 | 1.01 | 0.98 |
| SubAd 7 d@70° C. (%) | 94 | 100 | 97 |
| Loop tack (N) according to FINAT3 (1 d@23° C.) | 23.8 | 25.1 | 22.5 |
| Loop tack (%) according to FINAT3 (1 d@23° C.) | 111 | 117 | 105 |
| Release Tesa 7475 | | | |
| 1 d @ 23° C. | 8.6 | 8.7 | 8.4 |
| 1 d @ 70° C. | 11.73 | 10.37 | 10.23 |
| 7 d @70° C. | 16.43 | 12.56 | 12.38 |
| Release Tesa 4651 | | | |
| 1 d @ 23° C. | 26.9 | 28.1 | 25.9 |
| 1 d @ 70° C. | 43.1 | 35.4 | 32.2 |
| 7 d @70° C. | 70.1 | 70.3 | 71.7 |

Contrary to comparative tests 1 and 2, example 1 according to the invention does not exhibit any release of benzaldehyde or of isopropanol during the UV-crosslinking of the silicone composition coated on a polyester film; the crosslinking of the coating is optimal and the peeling forces of the adhesive of the multi-layer item are satisfactory even after aging.

TABLE 4

Coatings obtained from a silicone oil comprising pendant acrylate functions or from a mixture of 2 silicone oils comprising pendant acrylate functions - varying amounts of photoinitiators.

| Item | Examples according to the invention | | | | | | | | | |
|---|---|---|---|---|---|---|---|---|---|---|
| Composition | Ex. 3 | Ex. 4 | Ex. 5 | Ex. 6 | Ex. 7 | Ex. 9 | Ex. 10 | Ex. 11 | Ex. 12 | Ex. 13 |
| A1 | 100 | 100 | 99 | 99 | 97.5 | 97.5 | 97.5 | 95 | 95 | 95 |
| A2 | — | — | 1 | 1 | 2.5 | 2.5 | 2.5 | 5 | 5 | 5 |
| P3 | 2 | 4 | 2 | 4 | 1 | 2 | 4 | 1 | 2 | 4 |
| Support | OPP CR30 film (Innovia) | | | | | | | | | |
| | Speed 50 m/min | | | | | | | | | |
| | Lamp 100 W/cm | | | | | | | | | |
| Deposit (g/m$^2$) | 1.01 | 0.94 | 0.97 | 0.86 | 0.93 | 1.00 | 0.91 | 0.90 | 0.85 | 0.89 |
| RC coating characterization | | | | | | | | | | |
| Smear | A | A | A | A | A | A | A | A | A | A |
| Rub-off @ 0 d | 10 | 10 | 10 | 10 | 10 | 10 | 10 | 10 | 10 | 10 |
| Rub-off @ 7 d | 10 | 10 | 10 | 10 | 10 | 10 | 10 | 10 | 10 | 10 |
| Extractions (%) | 3.8 | 3.8 | 3.7 | 5.1 | 5.4 | 5.2 | 5.0 | 4.2 | 4.7 | 4.8 |
| Multi-layer item characterization | | | | | | | | | | |
| Subadhesion 1 d@23° (ref Tesa7475) | 0.95 | 0.94 | 0.88 | 0.97 | 0.93 | 0.94 | 0.98 | 0.92 | 0.9 | 0.9 |
| Subadhesion 1 d@23° C. (%) | 99.0 | 97.9 | 91.7 | 101.0 | 96.9 | 97.9 | 102.1 | 95.8 | 93.8 | 93.8 |

TABLE 4-continued

Coatings obtained from a silicone oil comprising pendant acrylate functions or from a mixture of 2 silicone oils comprising pendant acrylate functions - varying amounts of photoinitiators.

| Item Composition | Examples according to the invention | | | | | | | | | |
|---|---|---|---|---|---|---|---|---|---|---|
| | Ex. 3 | Ex. 4 | Ex. 5 | Ex. 6 | Ex. 7 | Ex. 9 | Ex. 10 | Ex. 11 | Ex. 12 | Ex. 13 |
| Release TESA7475 | | | | | | | | | | |
| 1 d @ 23° C. | 3.8 | 4.7 | 3.6 | 4.5 | 2.9 | 3.6 | 4.7 | 2.9 | 3.5 | 5.3 |
| 1 d @ 70° C. | 5.3 | 7.4 | 5.3 | 7.5 | 4.0 | 5.1 | 7.6 | 4.0 | 5.6 | 8.8 |
| 7 d @ 70° C. | 7.5 | 27.8 | 7.7 | 9.3 | 5.9 | 7.0 | 9.9 | 6.0 | 8.3 | 11.6 |
| Release TESA4651 | | | | | | | | | | |
| 1 d @ 23° C. | 10.1 | 13.4 | 8.3 | 11.5 | 6.1 | 7.4 | 12.2 | 5.6 | 7.4 | 12.9 |
| 1 d @ 70° C. | 17.8 | 26.9 | 13.4 | 23.2 | 9.3 | 12.7 | 23.8 | 9.3 | 13.7 | 28.2 |
| 7 d @ 70° C. | 22.2 | 39.3 | 17.8 | 29.1 | 14.5 | 15.7 | 31.0 | 14.0 | 17.4 | 36.4 |

All the examples according to the invention exhibit no release of benzaldehyde and/or isopropanol during the UV-crosslinking of the silicone compositions based on an oil comprising acrylate functions according to the invention or on the mixture of two oils comprising acrylate functions according to the invention, coated on a polypropylene film. Furthermore, the crosslinking of the coatings is optimal and the peeling forces of the adhesive of the multi-layer items are correct, regardless of the photoinitiator concentration.

TABLE 5

Coatings obtained from a mixture of two silicone oils comprising acrylate functions which are respectively pendant and at the chain ends:

| Item | Comparative example 3 | Example 14 |
|---|---|---|
| Composition | | |
| A3 | 30 | 30 |
| A5 | 70 | 70 |
| P2 | 2 | |
| P3 | | 2 |
| Support | Lumirror PET film | |
| | Speed 50 m/min | |
| | Lamp 100 W/cm | |
| Deposit (g/m²) | 0.75 | 0.73 |
| Reaction by-product: benzaldehyde | no | no |
| Reaction by-product: isopropanol | yes | no |
| RC coating characterization | | |
| Smear | B | A |
| Rub-off | 2 | 10 |
| Dewetting | 0 | 10 |
| Extractables (100 cm²) (%) | 17.4 | 7.3 |
| Multi-layer item characterization | | |
| SubAd 1 d@70° C. (ref TESA 7475) | ND | 0.9 |
| SubAd 1 d@70° C. (%) | ND | 84.9 |
| SubAd 7 d@70° C. (ref TESA 7475) | ND | 0.92 |
| SubAd 7 d@70° C. (%) | ND | 85.44 |
| Loop tack (N) according to FINAT3 (1 d@23° C.) | ND | 20.8 |
| Loop tack (%) according to FINAT3 (1 d@23° C.) | ND | 75.9 |
| Release Tesa 7475 | | |
| 1 d @ 23° C. | ND | 6.52 |
| 1 d @ 70° C. | ND | 7.9 |
| 7 d @70° C. | ND | 20.2 |
| Release Tesa 4651 | | |
| 1 d @ 23° C. | ND | 13.69 |
| 1 d @ 70° C. | ND | 11.5 |
| 7 d @70° C. | ND | 11.94 |

ND = not determined since high content of extractables

Contrary to comparative example 3, example 14 according to the invention exhibits no release of benzaldehyde or of isopropanol during the UV-crosslinking of the silicone composition based on two silicone oils comprising acrylate functions according to the invention, coated on a polyester film. Furthermore, the crosslinking of the coating and the peeling forces of the adhesive of the multi-layer item are correct.

The photoinitiator used in comparative example 3 does not allow satisfactory crosslinking of the composition based on two silicone oils comprising acrylate functions which are respectively pendant and at the chain ends (content of extractables 17.4%).

TABLE 6

Coatings obtained from a mixture of a silicone oil comprising pendant acrylate functions and of a silicone oil comprising chain-end and pendant acrylate functions.

| Item | Example 15 Invention |
|---|---|
| Composition | |
| A3 | 30 |
| A4 | 70 |
| P3 | 2 |
| Support | Lumirror PET film |
| | Speed 50 m/min |
| | Lamp 100 W/cm |

TABLE 6-continued

Coatings obtained from a mixture of a silicone oil comprising pendant acrylate functions and of a silicone oil comprising chain-end and pendant acrylate functions.

| Item | Example 15 Invention |
|---|---|
| RC coating characterization | |
| Deposit (g/m$^2$) | 0.74 |
| Smear | A |
| Rub-off | 10 |
| Extractables (100 cm$^2$) dosage value | 3.6 |
| Extractables (100 cm$^2$) (%) | 6.5 |
| Multi-layer item characterization | |
| Subadhesion 1 d@70° c. (ref Tesa 7475) | 0.85 |
| Subadhesion 1 d@70° c. (%) | 79.73 |
| Subadhesion 7 d@70° c. (ref Tesa 7475) | 0.89 |
| Subadhesion 7 d@70° c. (%) | 82.91 |
| Loop tack (N) according to FINAT3 (1 d@23° C.) | 19.42 |
| Loop tack (%) according to FINAT3 (1 d@23° C.) | 70.90 |
| Release TESA 7475 | |
| 1 d @ 23° C. | 7.685 |
| 1 d @ 70° C. | 7.885 |
| 7 d @70° C. | 16.365 |
| Release TESA 4651 | |
| 1 d @ 23° C. | 10.155 |
| 1 d @ 70° C. | 10.6 |
| 7 d @70° C. | 36.18 |

Example 15 according to the invention exhibits no release of benzaldehyde and/or isopropanol during the UV-crosslinking of a composition comprising a mixture of a silicone oil comprising acrylate functions which are solely pendant and of a silicone oil comprising pendant and chain-end acrylate functions.

Furthermore, the crosslinking of the coating and the peeling forces of the adhesive of the multi-layer item are correct.

All of these examples clearly show that the use of a photoinitiator of acylphosphine oxide type, and more particularly ethyl (2,4,6-trimethylbenzoyl)phenylphosphinate, during the production of a self-adhesive multi-layer item makes it possible, on the one hand, to protect the operators and the environment and, on the other hand, to produce optimal properties regardless of the acrylate silicone oils used in the silicone composition employed, which is not the case with the photoinitiators that are most widely used industrially.

The invention claimed is:

1. A self-adhesive multi-layer item comprising:
1) A dorsal support DO having a top face SI1 and a bottom face SI2,
2) a first layer of silicone release coating RC applied to the top face SI1 of the dorsal support DO and which is prepared by irradiation of a curable silicone composition C not containing any solvent and comprising, as constituents:
   a) a functionalized organopolysiloxane A comprising:
      a1) a unit of formula (I) below:

$$R_a Z_b SiO_{(4-a-b)/2} \quad (I)$$

wherein each R, which may be identical or different, is independently selected from the group consisting of a linear or branched $C_1$ to $C_{18}$ alkyl group, a $C_6$ to $C_{12}$ aryl or aralkyl group, or an alkoxy radical —$OR^4$ with $R^4$ being a hydrogen atom or a hydrocarbon-based radical comprising from 1 to 10 carbon atoms;
      wherein each Z is a monovalent radical of formula -y-(Y')$_n$ in which:
         y is a linear or branched $C_1$-$C_{18}$ polyvalent alkylene radical,
         Y' is an alkenylcarbonyloxy monovalent radical, and
         n is equal to 1, 2 or 3, and
      a is an integer equal to 0, 1 or 2, b is an integer equal to 1 or 2 and the sum a+b=1, 2 or 3; and
   b) a type I photoinitiator P comprising a compound formula (III):

wherein $R^5$ is a monovalent radical —O—$R^8$ wherein $R^8$ is a hydrocarbon radical comprising from 1 to 8 carbon atoms;
      wherein $R^6$ is a phenyl radical; and
      wherein $R^7$ is a hydrocarbon radical comprising from 1 to 12 carbon atoms, a benzyl radical or a phenyl radical optionally substituted with a substituent selected from the group consisting of a halogen atom, a hydrocarbon radical comprising from 1 to 8 carbon atoms, a hydrocarbon-based alkoxy radical comprising from 1 to 8 carbon atoms and a cycloalkyl radical;
3) A first layer of pressure sensitive adhesive applied on the first layer of silicone release coating,
4) a frontal support FR applied on the first layer of pressure sensitive adhesive; and
5) optionally, a second layer of silicone release coating RC applied on the bottom face SI2 of the dorsal support DO and which is prepared by application and irradiation of said curable silicone composition C, and on this second layer, there is a second layer of pressure sensitive adhesive.

2. The self-adhesive multi-layer item as claimed in claim 1, wherein the dorsal support DO is selected from the group consisting of: polymer films and papers.

3. The self-adhesive multi-layer item as claimed in claim 1, wherein the frontal support FR is selected from the group consisting of: a paper, metal sheets, polycarbonates, polyethylene films, polyethylene terephthalate films, polypropylene films and vinyl films.

4. The self-adhesive multi-layer item as claimed in claim 1, wherein the effective amount of the type I photoinitiator P is between 0.1% and 5% by weight relative to the weight of the functionalized organopolysiloxane A.

5. The self-adhesive multi-layer item as claimed in claim 1, wherein the photoinitiator P is ethyl (2,4,6-trimethylbenzoyl)phenylphosphinate.

6. The self-adhesive multi-layer item as claimed in claim 1, wherein said item is a self-adhesive label or a self-adhesive tape.

7. A self-adhesive multi-layer item comprising:
1) A dorsal support DO having a top face SI1 and a bottom face SI2,
2) a first layer of silicone release coating RC applied on the top face SI1 of the dorsal support DO and which is prepared by irradiation of a curable silicone composition C not containing any solvent and comprising as constituents:
   a) at least one a functionalized organopolysiloxane A comprising:
      a1) at least one a unit of formula (I) below:

$$R_a Z_b SiO_{(4-a-b)/2} \quad (I)$$

wherein each R, which may be identical or different, is a linear or branched $C_1$ to $C_{18}$ alkyl group, a $C_6$ to $C_{12}$ aryl or aralkyl group, or an alkoxy radical —$OR^4$ wherein $R^4$ is a hydrogen atom or a hydrocarbon-based radical comprising from 1 to 10 carbon atoms,
         wherein each Z is a monovalent radical of formula -y-$(Y')_n$ in which:
            y is a linear or branched $C_1$-$C_{18}$ polyvalent alkylene radical,
            Y' is an alkenylcarbonyloxy monovalent radical, and
            n is equal to 1, 2 or 3, and
         a is an integer equal to 0, 1 or 2, b is an integer equal to 1 or 2 and the sum a+b=1, 2 or 3; and
   b) a type I photoinitiator P comprising a compound of-formula (III)

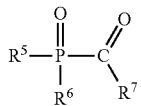

(III)

wherein:
      $R^5$ is a monovalent radical —O—$R^8$ wherein $R^8$ is a hydrocarbon radical comprising from 1 to 8 carbon atoms;
      $R^6$ is a phenyl radical; and
      $R^7$ is a hydrocarbon radical from 1 to 12 carbon atoms, a benzyl radical or a phenyl radical optionally substituted with a hydrocarbon-based radical comprising from 1 to 8 carbon atoms, a hydrocarbon-based alkoxy radical comprising from 1 to 8 carbon atoms and/or a cycloalkyl radical; and
3) a pressure sensitive adhesive applied on the bottom face SI2 of the dorsal support DO.

8. The self-adhesive multi-layer item as claimed in claim 1, wherein, in a1), each substitutent R, which may be identical or different, is selected from the group consisting of $C_6$ to $C_{12}$ aryl group, an aralkyl group, a halogen-substituted $C_6$ to $C_{12}$ aryl group, and a halogen-substituted aralkyl.

9. The self-adhesive multi-layer item as claimed in claim 1, wherein, in a1), the symbol Z is selected from the group consisting of monovalent radicals of formula -y-$(Y')_n$ in which: y represents a linear or branched $C_1$-$C_{18}$ polyvalent alkylene radical bonded to one or more hydroxy-substituted $C_1$ to $C_4$ oxyalkylene or polyoxyalkylene divalent radicals.

10. The self-adhesive multi-layer item as claimed in claim 1, wherein the functionalized organopolysiloxane A further comprises:
   a2) a unit of formula (II) below:

$$R_a SiO_{(4-a)/2} \quad (II)$$

wherein:
      each R, which may be identical or different, is independently selected from the group consisting of a linear or branched $C_1$ to $C_{18}$ alkyl group, a $C_6$ to $C_{12}$ aryl or aralkyl group, each of which may be substituted by one or more halogen atom, and
      a is an integer equal to 0, 1, 2 or 3.

11. The self-adhesive multi-layer item as claimed in claim 1, wherein, in b), $R^6$ is a phenyl radical substituted with:
   one or more halogen atom(s),
   a hydrocarbon-based radical comprising from 1 to 8 carbon atoms,
   a hydrocarbon-based alkoxy radical comprising from 1 to 8 carbon atoms, and/or
   a hydrocarbon-based thio radical comprising from 1 to 8 carbon atoms.

12. The self-adhesive multi-layer item as claimed in claim 1, wherein the effective amount of the type I photoinitiator P is between 0.1 and 3% by weight relative to the weight of the functionalized organopolysiloxane A.

13. The self-adhesive multi-layer item as claimed in claim 7, wherein, in a1), each R, which may be identical or different, is independently selected from the group consisting of $C_6$ to $C_{12}$ aryl group, an aralkyl group, a halogen-substituted $C_6$ to $C_{12}$ aryl group, and a halogen-substituted aralkyl group.

14. The self-adhesive multi-layer item as claimed in claim 7, wherein, in a1), each Z is selected from the group consisting of monovalent radicals of formula -y-$(Y')_n$ in which: y represents a linear or branched $C_1$-$C_{18}$ polyvalent alkylene radical bonded to one or more $C_1$ to $C_4$ hydroxy-substituted oxyalkylene or polyoxyalkylene divalent radicals.

15. The self-adhesive multi-layer item as claimed in claim 7, wherein the functionalized organopolysiloxane A further comprises:
   a2) a unit of formula (II):

$$R_a SiO_{(4-a)/2} \quad (II)$$

wherein:
      each R, which may be identical or different, is independently selected from the group consisting of a linear or branched $C_1$ to $C_{18}$ alkyl group, a $C_6$ to $C_{12}$ aryl and a $C_6$ to $C_{12}$ aralkyl group, all of which may be substituted by one or more halogen atoms, and
      a is an integer equal to 0, 1, 2 or 3.

16. A substrate at least partially coated with a release coating prepared by application of the curable silicone composition C as defined in claim 1 and irradiation by ultraviolet radiation so as to bring about crosslinking thereof.

* * * * *